United States Patent
Liao et al.

(10) Patent No.: US 9,304,959 B2
(45) Date of Patent: Apr. 5, 2016

(54) METHOD OF OPTIMIZING THE WIDTH OF TRANSACTION ID FOR AN INTERCONNECTING BUS

(71) Applicants: Ying-Ze Liao, Yunlin County (TW); Pei Yu, Hsinchu (TW); Yung-Sheng Fang, Kaohsiung (TW)

(72) Inventors: Ying-Ze Liao, Yunlin County (TW); Pei Yu, Hsinchu (TW); Yung-Sheng Fang, Kaohsiung (TW)

(73) Assignees: Global Unichip Corp., Hsinchu (TW); Taiwan Semiconductor Manufacturing Company Ltd., Hsinchu (TW)

( * ) Notice: Subject to any disclaimer, the term of this patent is extended or adjusted under 35 U.S.C. 154(b) by 479 days.

(21) Appl. No.: 13/965,226

(22) Filed: Aug. 13, 2013

(65) Prior Publication Data

US 2015/0052271 A1   Feb. 19, 2015

(51) Int. Cl.
*G06F 13/368* (2006.01)

(52) U.S. Cl.
CPC ................... *G06F 13/368* (2013.01)

(58) Field of Classification Search
CPC ..................................................... G06F 13/368
USPC .......................................................... 710/110
See application file for complete search history.

(56) References Cited

U.S. PATENT DOCUMENTS

| | | | | |
|---|---|---|---|---|
| 2005/0138252 A1* | 6/2005 | Gwilt | ....................... | G06F 13/36 710/110 |
| 2012/0215955 A1* | 8/2012 | Yun | ....................... | G06F 13/1657 710/110 |
| 2012/0303848 A1* | 11/2012 | Vallapaneni | .......... | G06F 13/364 710/110 |
| 2012/0311210 A1* | 12/2012 | Pullagoundapatti | | G06F 15/17312 710/110 |
| 2013/0246682 A1* | 9/2013 | Jandhyam | ........... | G06F 13/1626 710/310 |
| 2014/0006644 A1* | 1/2014 | Pullagoundapatti | | G06F 12/0284 710/4 |

* cited by examiner

*Primary Examiner* — Glenn A Auve
(74) *Attorney, Agent, or Firm* — Min-Lee Teng; Litron Patent & Trademark Office

(57) ABSTRACT

The present invention discloses a method of to generate transaction ID(s) in a bus interconnection design. An encoding table for each slave can be derived by calculating all possible transactions from all the masters to the slave so as to determine the minimum width of the transaction ID received by the slave in the interconnecting bus design, thereby avoiding the routing congestion in the interconnecting bus.

5 Claims, 4 Drawing Sheets

--- providing a plurality of masters and at least one slave, wherein each of the plurality of masters sends at least one transaction to at least one of the plurality of slaves; and for each of the at least one slave, comprising the following sub-steps of: — 301 determining the total number of the transactions of all the masters that send at least one transaction to the slave; — 302 determining the smallest integer n such that 2n is greater than or equal to the total number of the transactions; — 303 setting the transaction ID width to the smallest integer W and assigning each transaction of the total number of the transactions a unique transaction ID to identify each transaction, respectively, according to the transaction ID width. — 304

US 9,304,959 B2

METHOD OF OPTIMIZING THE WIDTH OF TRANSACTION ID FOR AN INTERCONNECTING BUS

BACKGROUND OF THE INVENTION

1. Field of the Invention

The invention relates in general to a bus interconnection design and, in particular, to a bus interconnection design based on transaction ID.

2. Description of the Prior Art

Advanced eXtensible Interface (abbreviated as AXI hereafter), the third generation of AMBA interface defined in the AMBA 3 specification, is targeted at high performance, high clock frequency system designs and includes features which makes it very suitable for high speed sub-micrometer interconnect(ions)?. The AXI bus system supports multiple outstanding addresses issue and out of order completion and therefore needs an encoding table to identify different transactions. The conventional method is to append the ID bits, which are used to identify each master, to a transaction ID to identify which master is the source of the transaction.

FIG. 1A shows an example of using the conventional method to obtain the encoding table. There are 7 masters, M0, M1, M2, M3, M4, M5, M6 and M7, and 4 slaves, S0, S1, S2 and S3, connected through an interconnecting bus. The master ID bits of M0 are 4bxxxx, which means that the master M0 can initiate 16 transactions currently; the master ID bits of M1 are 3bxxx, which means that the master M1 can initiate 8 transactions currently; the master ID bits of M2 are 2bxx, which means that the master M2 can initiate 4 transactions currently.

Each of the master, M3, M4, M5 and M6, has zero master ID width, which means only one transaction can be initiated by each of M3, M4, M5 or M6. As the total number of masters is 7, 3 bits are needed to identify each master. The interconnection will append the 3 bits to each transaction ID to make the transaction ID unique in the interconnection bus. The transaction ID from M0 is therefore 7 bits, which includes 4 bits to identify the transactions of the M0 and 3 bits for identifying the master M0 itself. When a transaction ID returns from a slave, the interconnection will decode the transaction ID to obtain the original sourcing master.

FIG. 1B shows an example of a conventional multi-level interconnecting bus design, wherein there is an internal node that has a slave port SP and a master port MP. As the slave port SP receives transactions from 6 masters and the master M1 has the longest master ID width of 3 bits, 6 bits are needed to encode all the transactions received by the slave port SP. For slave S0, 7 bits, including 6 bits to represent all the ID transactions received by the SP and one bit to identify M0 and MP, are needed to encode all the transactions received by S0.

Some solutions have been proposed in the past to reduce the width of the transaction ID. As described in US, 20120311210, titled "System and method for optimizing slave transaction ID width based on sparse connection in multilayer multilevel interconnect system-on-chip architecture," slave transaction ID width can be optimized by considering sparse connection between multiple masters and multiple slaves in a multilayer multilevel interconnect system-on-chip (SOC) architecture, and a optimized slave transaction ID for each master to any slave is then generated by removing the don't care bits in each generated slave transaction ID based on the sparse connection information. However, the solution described in the US, 20120311210 is not guaranteed to generate an optimum transaction ID width in all cases in which the interconnections between masters and slaves and the widths of master ID(s) are varied from design to design.

Therefore, what is needed is an efficient and systematic way to generate transaction ID(s) in an interconnecting bus design to optimize the width of transaction ID.

SUMMARY OF THE INVENTION

One objective of present invention is to provide a method of encoding the transaction ID in an interconnecting bus by gathering all possible ID transactions of each slave to optimize the width of transaction ID in the interconnecting bus design, thereby avoiding routing congestion in the interconnecting bus.

In one embodiment, a method of generating transaction ID(s) in an interconnecting bus, comprising the steps of: providing a plurality of masters and a plurality of slaves connected to the bus interconnection, wherein each of the plurality of masters sends at least one transaction to at least one of the plurality of slaves; for each slave of the plurality of slaves, comprising the sub-steps of: determining the total number of the transactions of all the masters that send at least one transaction to the slave according to the master ID width of each master; determining the smallest integer n such that $2^n$ is greater than or equal to the total number of the transactions; setting the transaction ID width to the smallest integer n and assigning each transaction of the total number of the transactions a unique transaction ID to identify each transaction, respectively, according to the transaction ID width, n.

In one embodiment, in the method described above, the total number of the transactions of all the masters is the sum of the actual number of transactions of each master. In one embodiment, in the method described above, the total number of the transactions of all the masters is the sum of the maximum number transactions of each master, wherein the maximum number transactions of the master of which the master ID width m is equal to $2^m$. In one embodiment, in the method of described above, the bus interconnection design is based on AXI specification.

With the brief description of drawings and detailed description of embodiment disclosed below, advantage, scope, and technical details of this invention are easy to be understood.

BRIEF DESCRIPTION OF DRAWINGS

The foregoing aspects and many of the accompanying advantages of this invention will become more readily appreciated as the same becomes better understood by reference to the following detailed description, when taken in conjunction with the accompanying drawings, wherein.

DETAILED DESCRIPTION OF EMBODIMENT

Figure 1A:
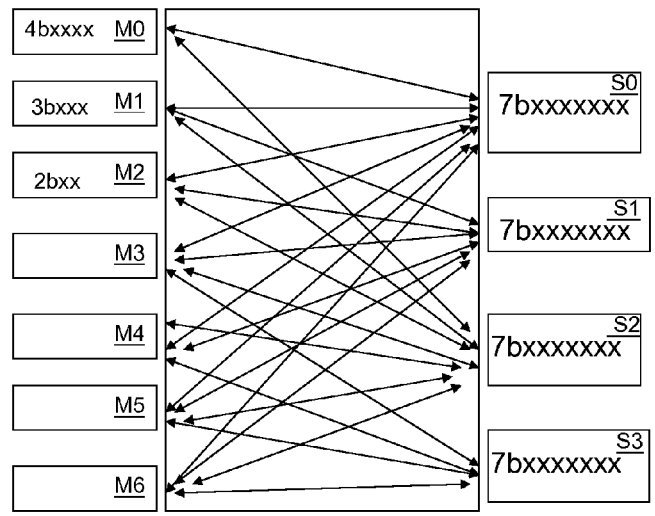
FIG. 1A-1B illustrates a conventional way to encode transaction ID(s) in an interconnecting bus design.
Figure 1B:
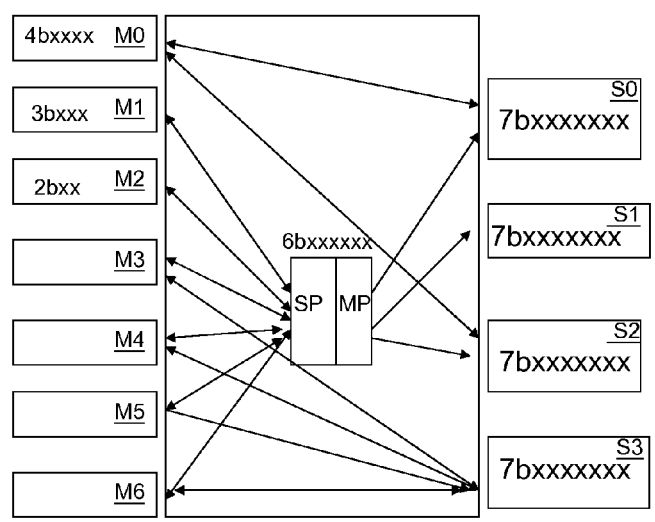

The detailed explanation of the present invention is described as following. The described preferred embodiments are presented for purposes of illustrations and description, and they are not intended to limit the scope of the present invention.

In this invention, a method to generate transaction ID(s) in an interconnection design is disclosed. For an interconnecting architecture, such as AXI, supporting out-of-order transaction completions, a unique transaction ID to identify each transaction is needed in the interconnection design. As the number of masters of the AXI interconnection increases and the widths of master ID(s) varies, the number of bits on the transaction ID bus of the AXI interconnection becomes larger and larger. To solve this issue, present invention provides a method to reduce the AXI ID bus width by optimizing the ID bus width for each slave, thereby easing routing congestion in the AXI interconnection.

To be specific, the master ID width is hereby defined as follows. A master with a master ID width, m, means the maximum number of transactions, or the number of all possible transactions, that can be generated by the master is $2^m$; and the minimum number of transactions that can be generated by the master is $2^{m-1}+1$, wherein the actual number of transactions that can be generated by the master is in the range from $(2^{m-1}+1)$ to $2^m$. For example, a master with a 4 bits master ID width, the maximum number of transactions that can be generated by the master is 16 and the minimum number of transactions that can be generated by the master is 9; and he actual number of transactions that can be generated by the master is in the range from 9 to 16.

A method of generating transaction ID(s) in an interconnecting bus design in accordance with one embodiment of the present invention is disclosed, wherein the method comprises the steps of: providing a plurality of masters and a plurality of slaves connected to the bus interconnection, wherein each of the plurality of masters sends at least one transaction to at least one of the plurality of slaves; for each slave of the plurality of slaves, comprising the sub-steps of: determining the total number of the transactions of all the masters that send at least one transaction to the slave according to the master ID width of each master; determining the smallest integer n such that $2^n$ is greater than or equal to the total number of the transactions; setting the transaction ID width to the smallest integer n and assigning each transaction of the total number of the transactions a unique transaction ID to identify each transaction, respectively, wherein the transaction ID is within the range from zero to $(2^n-1)$. That is, the transaction ID is coded in n binary bits.

In one embodiment, the total number of the transactions of all the masters is the sum of actual number of transactions of each master. In one embodiment, the total number of the transactions of all the masters is the sum of the number of all possible transactions of each master according to the master ID width of each master, respectively. For example, if a master has a 4-bits master ID, the number of all possible transactions of the master is $2^4$, which is 16.

Figure 2A:
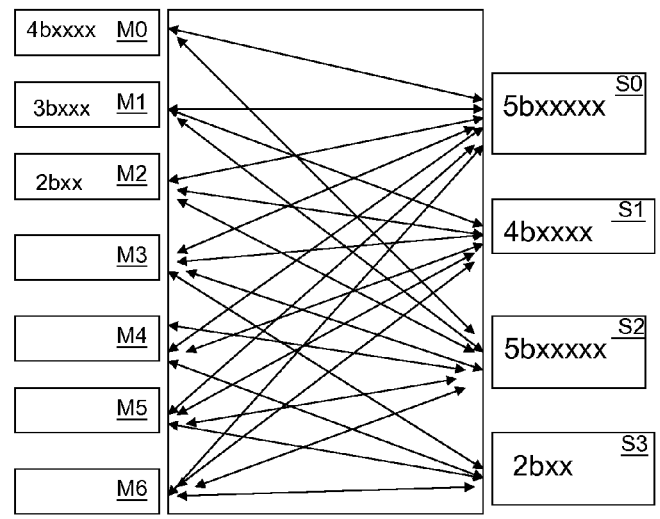
FIG. 2A-2B illustrates a diagram of an interconnecting bus in which transaction ID(s) are encoded in accordance with one embodiment of this invention.
Figure 2B:
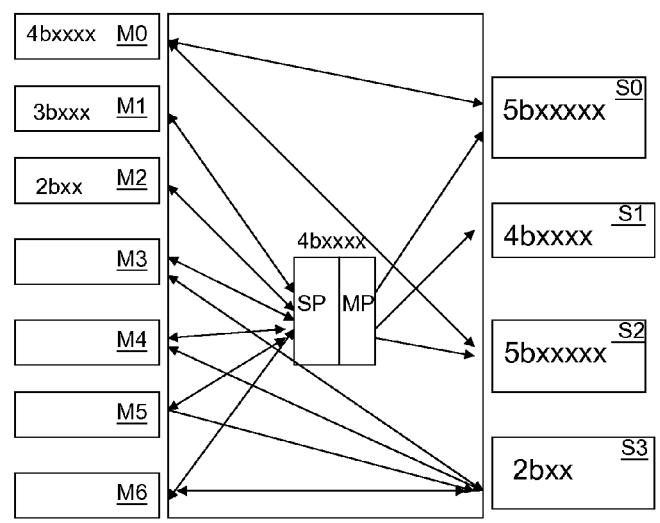

In one embodiment, please refer to FIG. 2 which illustrates a diagram of interconnections between masters and slaves according to one embodiment of current invention. As shown in FIG. 2, in one embodiment, the number of all possible transactions of each master is based on master ID width of each master; and the sum of all possible transactions from all the masters are added to obtain the width of the encoding table for each slave. For example, as shown in FIG. 2A, the master 0 M0 has 4 bits of ID, which means the possible transaction number is 16; the master 1 M1 has 3 bits of ID, which means the possible transaction number is 8; the master 2 M2 has 2 bits of ID, which means the possible transaction number is 4; and the M3, M4, M5 or M6 each has 0 bit of ID, which means the possible transaction number is 1. Considering slave port 0 S0, for example, all the possible transactions form all the masters to S0 are thus 32 (16+8+4+1+1+1+1), which is determined by adding all possible transactions from all the masters based on the master ID width of each master; therefore, 5 bits are needed to identify each transaction received by the slave S0. Then, an encoding table to identify each transaction received by save S0 is derived by the following steps. In the first step, a master, which is connected to S0 and has the longest master ID width, is chosen to derive the first entry of the encoding table. The master ID width of M0 is 4 bits ($2^4$=16) and it can take transaction ID from 0 to 15, so 5b0xxxx is assigned to M0 to represent all the transaction ID(s) of master M0, wherein a 0 is appended in front of the master ID bits of M0 since 5 bits has been chosen to identify each transaction for slave S0 as described above. In the next step, a master, which is not encoded yet and has the longest ID, is chosen to obtain the second entry of encoding table. The ID width of M1 is 3 bits ($2^3$=8) which can take transaction ID from 16 to 23, so 5b10xxx is assigned to master M1 to represent all the transaction ID(s) of master M1. In the next step, a master, which is not encoded yet and has the longest ID, is chosen to obtain the third entry of encoding table. The ID width of M2 is 2 bits ($2^2$=4) which can take transaction ID from 24 to 27, so 5b110xx is assigned to master M2 to represent all the transaction ID(s) of master M2. At last, each of M3, M4, M5 and M6 will take transaction ID 28, 29, 30 and 31, respectively.

Please note that the sequence of assigning a transaction ID to each transaction is not limited to the above example, and it can be any sequence as long as all the transactions are within the ID width of the encoding table and each has a unique transaction ID in the encoding table. In addition, based on the master ID width, a total number of transactions can be calculated by adding up a number of transactions of each master, wherein the number of transactions of the master is in the range from $(2^{m-1}+1)$ to $2^m$, wherein m is the ID width of the master. That is, the total number of transactions received by a given slave can be determined according to master ID width of each master, wherein the number of transactions that can be assigned to a master is in the range $(2^{m-1}+1)$ to $2^m$, wherein m is the ID width of the master. Please note that the number of transactions that can be assigned to a master can be equal to or grater than the actual number of transactions that will be initiated from the master. For example, if m equal to 4 and the actual number of transactions is 9, the number of transactions that is assigned to the master can be 9, 10, 11, 12, 13, 14, 15 or 16. However, selecting 16 will simplify the hardware design as it is aligned with the binary coding scheme.

Likewise, all the possible transactions to the slave S1 are 16 by adding together all possible transactions of M1, M2, M3, M4, M5 and M6, according to the master ID width of each master which sends transactions to the slave S1; therefore, 4 bits are needed to identify each transaction that is received by the slave S1. Then, an encoding table to identify each transaction received by save S1 is derived by the following steps. In the first step, the master, which is connected to S1 and has the longest ID width, is chosen to derive the first entry of the encoding table. The master ID width of the M1 is 3 bits ($2^3$=8), which represents 0-7, so 4b0xxx is assigned to master M1 to represent the transaction ID(s) of master M1. In the next step, a master, which is not encoded yet and has the longest master ID, is chosen to obtain the second entry of encoding table. The ID width of M2 is 2 bits ($2^2$=4), which represents 8-11, so 4b10xx is assigned to master M2 to represent the transaction ID(s) of master M2. Then, repeat the operation until all the masters connected to slave S1 are encoded. The encoded table of S2 will be the same as that of the S0 because S2 and S0 have the same interconnection from all the masters. Likewise, S3 is only connected to 4 masters with 0 ID widths so the total number of transactions received by slave S1 is 4 and 2 bits is needed to represent the transactions.

Figure 3:
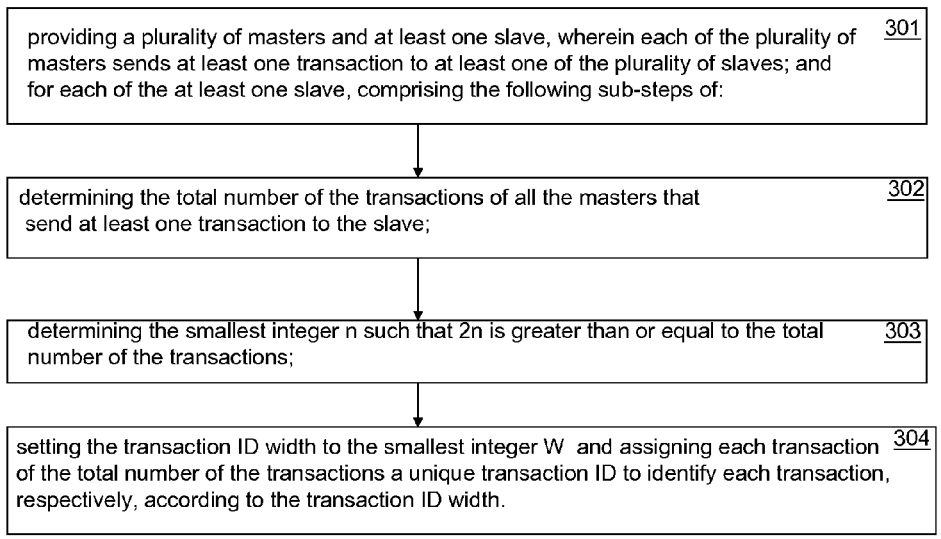
FIG. 3 illustrates a flowchart to encode transaction ID(s) in accordance with one embodiment of this invention.

The interconnections between masters and slaves can be hierarchical. FIG. 3 illustrates a hierarchical interconnection in which an internal node acts as an internal slave to receive transactions from masters and also acts as a master to initiate transactions to slaves. The same steps described above can be applied to derive the encoding table of the internal slave node. After the encoding table of the internal slave node is derived, it will serve as a master to the slaves connected therewith and the master ID width of the internal master node will be 4bxxxx. Therefore, the encoding table for each slave can be determined hierarchically.

FIG. 3 depicts a flowchart to encode transaction ID(s) according to one embodiment of current invention. In step 301, a plurality of masters and a plurality of slaves connected to the bus interconnection are provided, wherein each of the plurality of masters sends at least one transaction to at least one of the plurality of slaves; and for each slave of the plurality of slaves, comprising the sub-steps of: determining the total number of the transactions of all the masters that send at least one transaction to the slave (sub-step 302); determining the smallest integer n such that $2^n$ is greater than or equal to the total number of the transactions (sub-step 303); setting the transaction ID width to the smallest integer n and assigning each transaction of the total number of the transactions a unique transaction ID to identify each transaction, respectively, according to the transaction ID width n (sub-step 304).

Figure 4A:
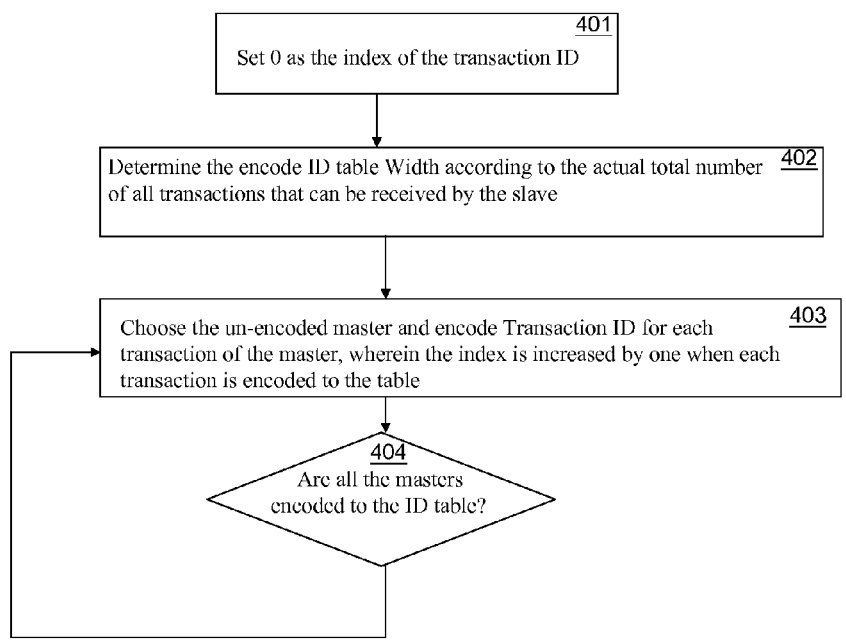
FIG. 4A-4B illustrates ways to assign transaction ID(s) based on FIG. 3 in accordance with one embodiment of this invention.
Figure 4B:
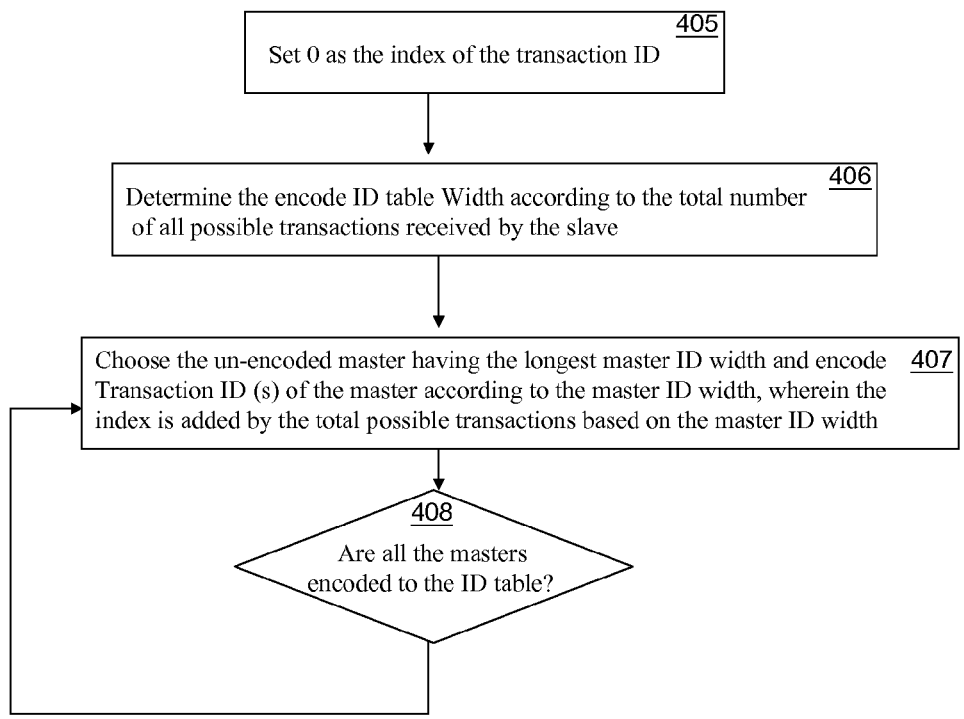

FIG. 4A-4B illustrates ways to count up transaction IDs based on FIG. 3 in accordance with one embodiment of this invention. As shown in FIG. 4A, Set 0 as the index of the transaction ID (step 401); determine the encode ID table width according to the actual total number of all transactions that can be received by the slave (step 402); then, choose the un-encoded master and encode Transaction ID for each transaction of the master, wherein the index is increased by one when each transaction is encoded to the table (step 403); and repeating the step 403 until all the masters are encoded to the ID table (step 404).

As shown in FIG. 4B, Set 0 as the index of the transaction ID (step 405); determine the encode ID table Width according to the total number of all possible transactions received by the slave (step 406); then, choose the un-encoded master having the longest master ID width and encode transaction ID(s) of the master according to the master ID width, wherein the index is added by the total possible transactions based on the master ID width (step 407); and repeating the step 403 until all the masters encoded to the ID table (step 408).

In summary, the width of the transaction ID for a given slave can be determined first and actual assignments of transaction ID(s) to each transaction can be done according to the width of the transaction ID of the given slave. The total number of the transactions can be determined either by the actual number of transactions from all the masters, or the total number of the transactions can be determined by adding up the number of possible transactions of each master, wherein the number of all possible transactions of the master is derived from the master ID width of the master even if the actual number of the transactions is less than the number of all possible transactions of the master. For example, if the actual number of transactions that can be initiated by a master is 14, the master ID width of the master is 4 and the number of all possible transactions of the master is 16.

Although embodiments described herein are based on AXI bus design, the scope and claims of the invention is not limited to the AXI bus design. The foregoing descriptions of specific embodiments of the present invention have been presented for purposes of illustrations and description. They are not intended to be exclusive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to particular use contemplated. It is intended that the scope of the invention be defined by the claims appended hereto and their equivalents.

What is claimed is:

1. A method of generating transaction ID(s) for an interconnecting bus, comprising the steps of:
    (a) providing a plurality of masters and a plurality of slaves, wherein the plurality of masters and the plurality of slaves are connected through the interconnecting bus;
    (b) for each slave of the plurality of slaves, generating a transaction ID for each transaction received by the slave, comprising the sub-steps of:
        b1. determining a total number of transactions which are to be received by the slave from the plurality of masters;
        b2. determining the smallest integer n such that $2^n$ is greater than or equal to the total number of transactions;
        b3. assigning each transaction of the total number of transactions a unique transaction ID to identify the transaction, respectively, wherein each of the assigned transaction ID is an integer and selected from the range: zero to $(2^n-1)$.

2. The method according to claim 1, wherein the total number of the transactions that are received from the plurality of masters is based on an actual number of transactions of each master.

3. The method according to claim 1, wherein the total number of the transactions that are received from the plurality of masters is based on all possible transactions of each master according to the ID width of the master.

4. The method according to claim 1, wherein the plurality of slaves comprises an internal slave node.

5. The method according to claim 1, wherein the bus interconnection design is based on AXI specification.

* * * * *